United States Patent
Twigg et al.

(10) Patent No.: US 6,294,141 B1
(45) Date of Patent: *Sep. 25, 2001

(54) EMISSION CONTROL

(75) Inventors: Martyn Vincent Twigg, Caxton; Anthony John Joseph Wilkins, Walden; Nigel Simon Will, Cambridge, all of (GB)

(73) Assignee: Johnson Matthey Public Limited Company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,979

(22) Filed: Oct. 14, 1997

(30) Foreign Application Priority Data

Oct. 11, 1996 (GB) ............................................ 9621215

(51) Int. Cl.$^7$ ............................ B01D 47/00; B01D 50/00; B01J 8/02; F01N 3/00
(52) U.S. Cl. ................... 423/213.7; 423/212; 423/213.2; 423/213.5; 423/213.7; 423/235; 423/239.1; 422/169; 422/171; 428/116; 60/272; 60/274; 60/282; 60/299
(58) Field of Search ................................ 423/212, 213.2, 423/213.5, 213.7, 235, 239.1; 422/169, 171; 428/116; 60/272, 274, 282, 299

(56) References Cited

U.S. PATENT DOCUMENTS

| | | |
|---|---|---|
| 4,303,552 | 12/1981 | Ernest et al. .......................... 252/465 |
| 4,451,441 | 5/1984 | Ernest et al. ........................ 423/213.2 |
| 4,516,990 | 5/1985 | Erdmannsdörfer et al. ............. 55/96 |
| 4,535,588 | 8/1985 | Sato et al. ............................... 60/286 |
| 4,670,233 | 6/1987 | Erdmannsdoerfer et al. .... 423/213.2 |
| 4,759,918 | * 7/1988 | Homeier et al. ................... 423/213.5 |
| 4,828,807 | 5/1989 | Domesle et al. ................... 423/213.7 |
| 4,849,274 | * 7/1989 | Cornelison ............................ 428/116 |
| 4,902,487 | * 2/1990 | Cooper et al. ..................... 423/213.5 |
| 5,746,989 | * 5/1998 | Murachi et al. ................... 423/212 R |

FOREIGN PATENT DOCUMENTS

| | | |
|---|---|---|
| 3337903 A1 | 5/1985 | (DE) . |
| 382434 | * 8/1990 | (EP) . |
| 1014498 | 10/1962 | (GB) . |
| 2 188 559 A | 10/1987 | (GB) . |
| Sho. 54-74419 | 6/1979 | (JP) . |
| WO 96/27078 | 9/1996 | (WO) . |

OTHER PUBLICATIONS

Abstract of JP09079024 Claiming Priority of 1995.

* cited by examiner

Primary Examiner—Steven P. Griffin
Assistant Examiner—Jonas N. Strickland
(74) Attorney, Agent, or Firm—Ratner & Prestia

(57) ABSTRACT

An emission control system especially for light duty diesel engines has a first catalyst, 2, positioned upstream of a second catalyst, 3. The first catalyst converts NO to $NO_2$ and the second catalyst oxidises HC, CO and VOF. The tendency of the second catalyst to collect soot particles is reduced by combustion of the soot particles by $NO_2$ from the first catalyst.

19 Claims, 4 Drawing Sheets

EMISSION CONTROL

Figure 1:
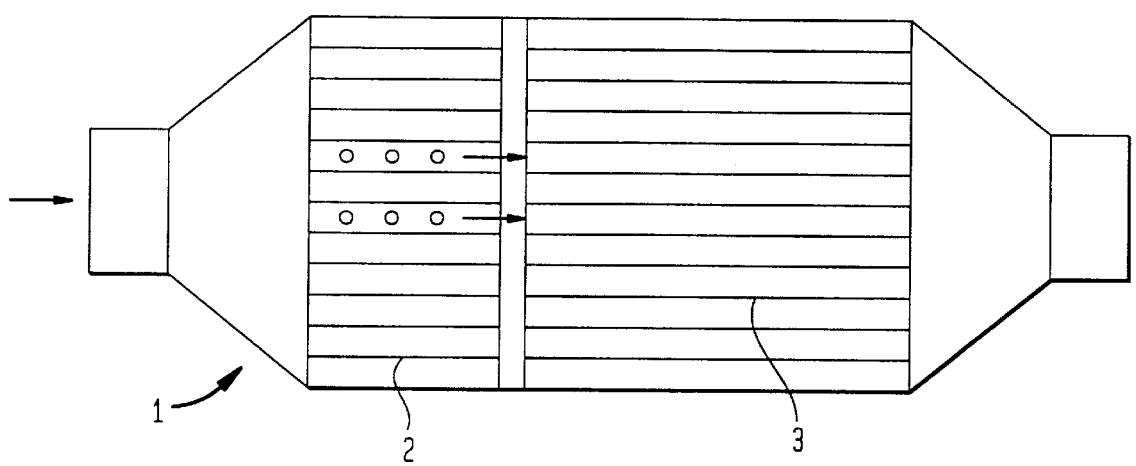

The present invention concerns emission control, and more especially it concerns the reduction or elimination of soot particle emission from internal combustion engine exhaust gas, particularly that from diesel (compression ignition) engines.

Although diesel engines generally emit considerably less gaseous pollutants, ie hydrocarbons ("HC"), carbon monoxide ("CO") and volatile organic fractions ("VOF") than gasoline spark ignition engines, it has become necessary to incorporate a catalyst in the exhaust gas system to meet current emission control regulations in the European Union for passenger cars and light vehicles. Such catalysts are generally based on metal or ceramic honeycomb substrate structures as are well known for oxidation or three-way catalysts for gasoline-engined vehicles. During certain normal operations of diesel engines, particularly low speed and low temperature driving conditions such as city driving, the catalysts can become covered with carbonaceous material or soot. This may inhibit the gaseous reactions normally taking place on the catalyst surface by covering catalyst surfaces, and in worst cases may block partially or totally the channels in the honeycomb substrate, resulting in high pressure drop that can impair engine performance.

The deliberate trapping and subsequent combustion of soot is known in the context of heavy duty diesels (trucks and buses) in order to improve the environment, and we refer to our U.S. Pat. No. 4,902,487 which describes a system which has now been commercialised as the Continuously Regenerating Trap ("CRT"). This patent teaches a system involving a filter to remove soot, and combusting the soot using a gas containing $NO_2$. Such a gas is produced by fitting a catalyst upstream of the filter, to oxidise nitric oxide present in the exhaust gas to $NO_2$. Heavy duty diesels provide exhaust gases at relatively high temperature, and low sulphur fuel needs to be used.

We have now discovered that a variation on the concept of the CRT may be used to deal with soot inadvertently trapped on a catalyst in a light duty diesel. Light duty diesels operate at appreciably lower temperatures, especially under light load, than heavy duty diesels, which is generally a disadvantage for catalytic processes. It is also the case that the new generation direct injection gasoline engines can be limited in their engine management by avoidance of soot-forming conditions. It can increase the engine operating envelope, and possibly increase economy under certain conditions, if an emission control system which can deal with soot, can be developed.

The present invention provides an emission control system for internal combustion engines which emit carbonaceous particulates, particularly for diesel, especially light duty diesel, engines, said system comprising a first catalyst effective to oxidise NO to $NO_2$ and a second catalyst, effective at least to oxidise HC, CO and VOF, each catalyst being supported on honeycomb flow-through monoliths, whereby soot particles trapped on or within said second catalyst monolith are combusted in the $NO_2$-containing gas from said first catalyst, and wherein the monolith used as a support for said first catalyst is such as to minimise the collection of soot particles.

Preferably, the first catalyst is formulated to have high activity for NO to $NO_2$ oxidation and is suitably a relatively high loading platinum catalyst. Such a catalyst may desirably have from about 50 to about 200 g Pt/ft$^3$ (1.77–7.06 g Pt/liter of catalyst volume).

The monolithic support used for the first catalyst is preferably a metal monolith which desirably provides flexing and/or vibration of the honeycomb cell walls for the purpose of displacing any soot particles captured within the monolith. The monolith may be consciously designed to encourage such flexing and/or vibration, possibly using the natural vibration modes of the diesel engine.

Desirably, the monolith is significantly more open than the monoliths used for oxidation or three-way catalysts especially for gasoline engines, which are, for example desirably 400 cells/in$^2$ (62 cells/cm$^2$) or higher, that is to say tend preferably to 600 cells/in$^2$ (93 cells/cm$^2$). Such a monolith may be, for example, 100 or 200 cells/in$^2$ (15.5 or 31 cells/cm$^2$). Desirably, the space velocity of gases flowing through the first catalyst is greater than that for the second catalyst, in order to reduce the opportunity for particulates to lodge therein.

The second catalyst may be a conventionally formulated diesel catalyst, for example on a monolith having 400 cells/in$^2$ or more. Soot formation from diesel engine exhausts has limited or excluded the use of the high cell density monoliths, which are desirable from a catalytic convertor viewpoint. The second catalyst could also be a three-way catalyst, especially of the "lean-NOx" type, in which in addition to the oxidation reactions in respect of HC, NO and VOF, there is reduction of NOx to $N_2$, perhaps intermittently by the mechanism of NOx storage on components in the catalyst or by continuous regeneration of a selective catalyst.

The first and/or second catalysts may incorporate trapping components, either as discrete traps prior to the catalyst or as components of a layered or composite catalyst construction, to trap water vapor, sulphur, HC and/or NOx until they are released under catalyst operating conditions favorable to their conversion or use.

It is to be understood that the complex and varying gas compositions in an operating condition may not provide total conversion of NO to $NO_2$, but other oxidised nitrogen oxides may be produced. The necessary reaction is that such product $NO_2$ or oxidised nitrogen oxides contribute to the combustion of the soot particles, and, for ease of reference, the designation $NO_2$ is used herein. The practical requirement is that sufficient $NO_2$ is produced so that build-up of soot is limited to below the levels at which problems arise. For this reason also, it may be desirable to have the first and second catalysts positioned close to each other, possibly within the same canister.

It is to be noted that some diesel fuels have high sulphur contents, eg above 500 ppm, and we have found that the presence of sulphur compounds can inhibit the reaction forming $NO_2$ over a platinum catalyst. Desirably, therefore, low S fuel is used, but the inhibiting effect of sulphur may be reduced to some extent by using high catalyst or gas temperatures during periods in which gas and/or catalyst temperatures would normally be low, for example under light load conditions. This can be achieved by positioning the catalyst close to the engine. If necessary, supplementary electrical heating of at least the upstream face of the catalyst, optionally assisted by or replaced by infra-red or visible wavelength radiation from a suitable source, may be used to ensure combustion of the soot particles during those parts of the engine operating cycle at which the exhaust gas temperature and/or the catalyst temperature are below optimum. Certain other catalysts, eg zeolite-based catalysts, are not so sensitive as platinum-based catalysts to sulphur compound inhibition, and may be used if appropriate.

The present invention as described herein may be modified by the skilled person without departing from the inventive concepts.

Initial tests confirming the benefits of the present invention were carried out on a modified 1996 Audi 2.5TDI. A first catalyst which was a high loading (90 g/cu ft=3.18 g/liter) platinum on a 4in×4 in metal honeycomb substrate of 200 cells/in² carrying a conventional oxide washcoat, was mounted upstream of the standard catalyst. Soot build-up under soot-forming conditions was reduced.

A further test was carried out by placing samples of standard diesel catalyst in the exhaust from a bench diesel engine for three hours. Visual inspection showed significant soot deposits. A 200 cells/in² (31 cells/cm²) metal honeycomb substrate carrying 70 g/ft³ (=2.47 g/liter) Pt was placed in front of the sooted catalyst and the engine was run again. After a further three hours, the catalyst was recovered. Visual inspection showed that the soot deposits were partly removed.

Similar tests were carried out in which the visual difference was not very marked, but there was a weight reduction indicating soot combustion. Activity of the second catalyst was improved compared to the sooted catalyst.

Figure 2:
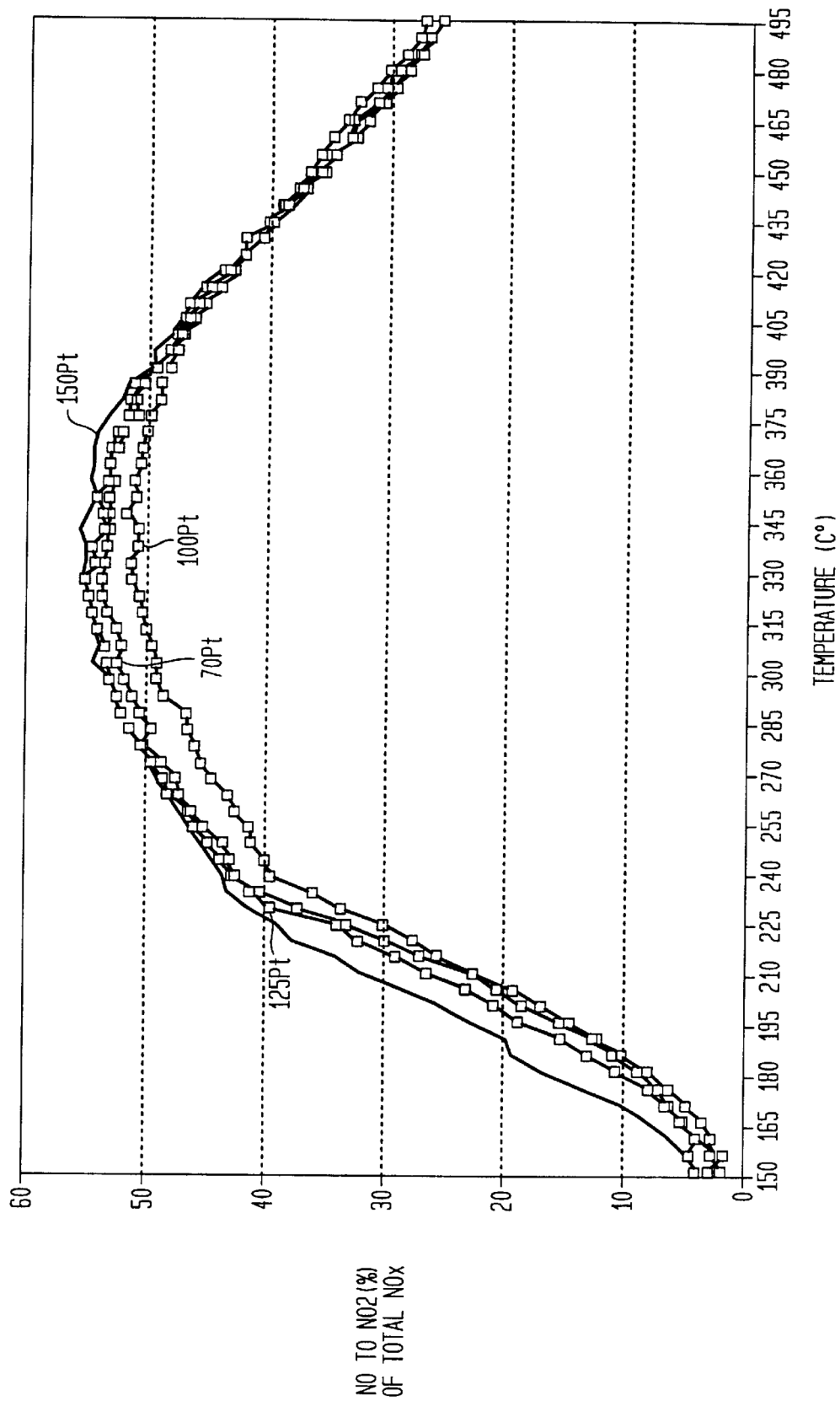
Figure 3:
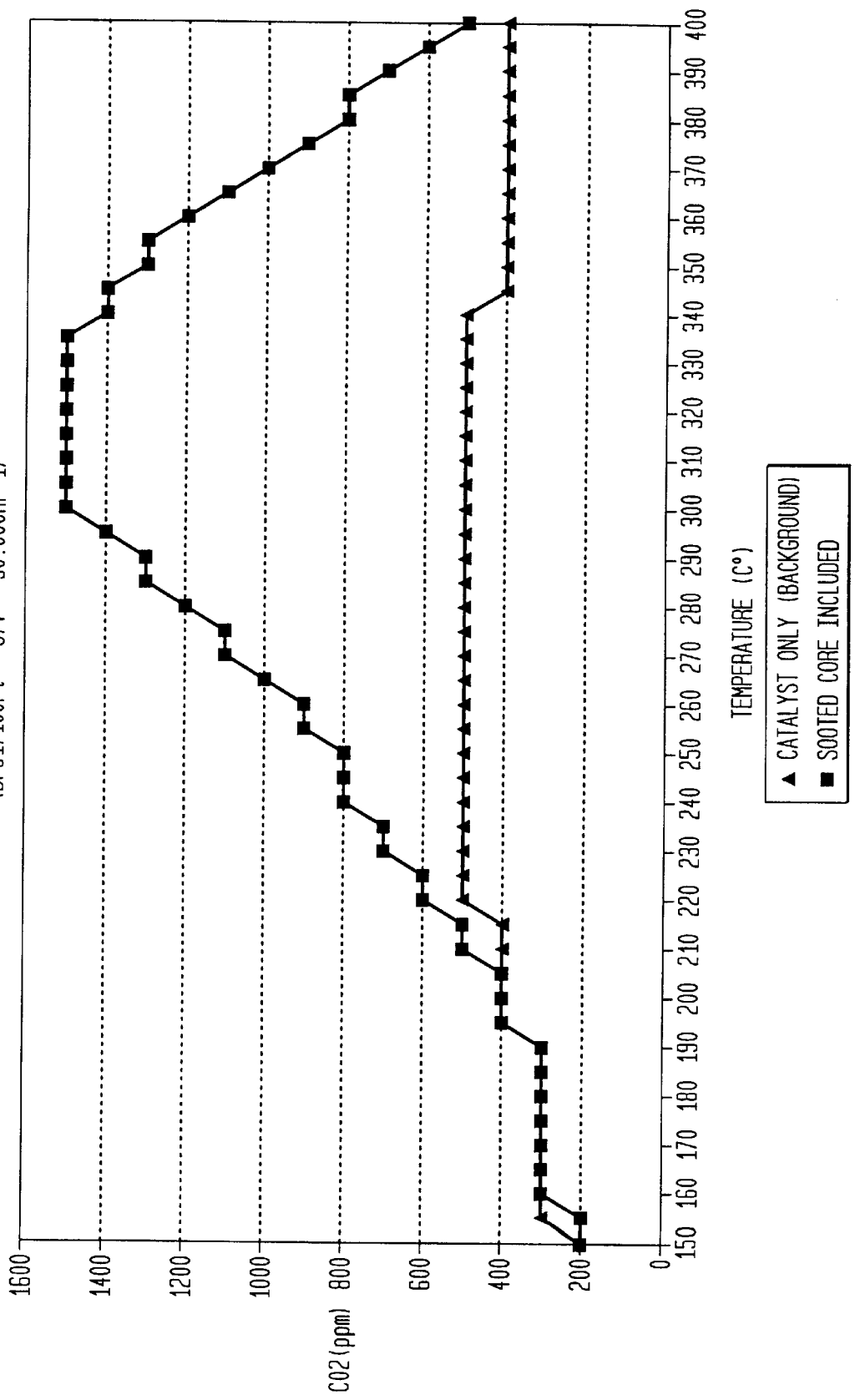
Figure 4:
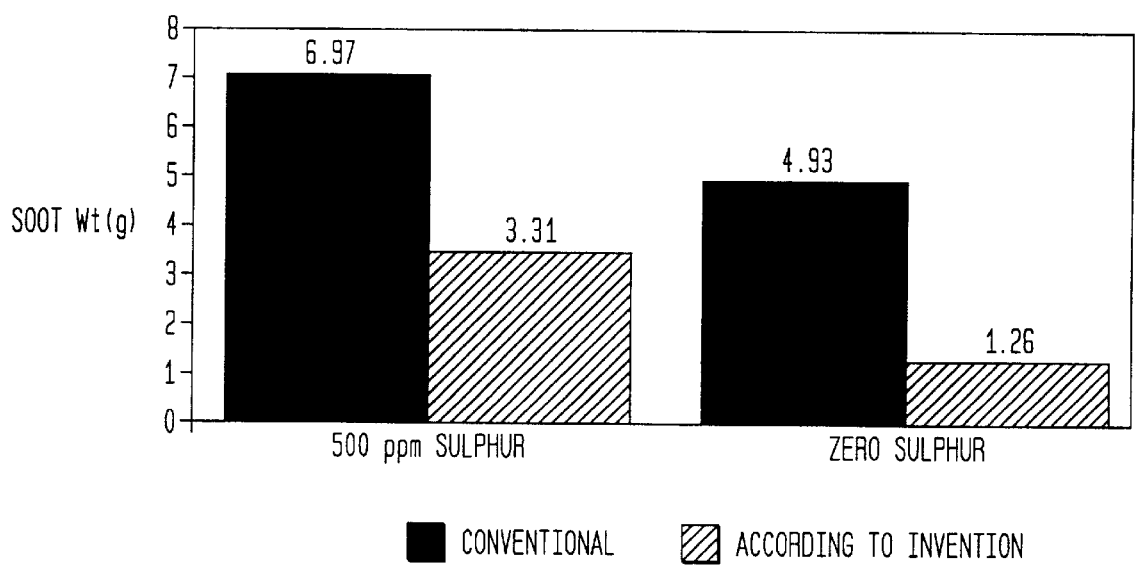

The invention will now be described with reference to the accompanying drawings, in which:

FIG. 1 is a schematic diagram of a catalyst system for a diesel engine according to the present invention, FIG. 2 is a chart showing $NO_2$ formation at different temperatures, FIG. 3 is a chart showing $CO_2$ formation at different temperatures, and FIG. 4 is a chart showing weights of soot collected on a second catalyst.

Referring to FIG. 1, a single canister, 1, for fitting in the exhaust system of a light-duty diesel engine, encloses a first catalyst, 2. Said first catalyst is a 200 cells/in² (62 cells/cm²) metal substrate catalyst, carrying an alumina washcoat and 120 g/ft³ (4.24 g/liter) of Pt. There is a 1 cm gap between the first catalyst and a second catalyst which is a 400 cells/in² (124 cells/cm²) conventional commercial diesel oxidation catalyst. The first catalyst is half the length of the second catalyst, and this, together with the lower number of cells per unit area, means that the space velocity over the first catalyst is appreciably greater than over the second catalyst.

In operation, NO emitted from the diesel engine is converted over the first catalyst to $NO_2$, according the equation

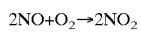

$$2NO+O_2 \rightarrow 2NO_2$$

Over the second catalyst, $NO_2$ reacts with carbonaceous soot particles trapped on the face of the second catalyst or in the cells, according to the equation

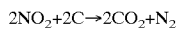

$$2NO_2+2C \rightarrow 2CO_2+N_2$$

A series of tests were carried out on a SCAT reactor (Simulated Car Activity Test) experimental rig. Samples of metal honeycomb catalyst substrate were washcoated with an alumina washcoat and loaded with different amounts of platinum by conventional impregnation technology, ranging from 70 to 150 g/ft³ (2.47—5.30 g/liter). The results are shown in FIG. 2 as % of total NOx converted to $NO_2$, plotted against temperature. Although, in general, the greater the Pt loading, the greater the conversion, the difference between the different Pt loadings was not dramatic.

The SCAT reactor rig was used again to test the effects of passing a synthetic exhaust gas comprising $NO_2$ over two samples of catalyst. One catalyst was as prepared, the other was a core cut from a catalyst which had been used in a diesel exhaust and therefore was sooted. $CO_2$ detected leaving the reactor is measured in ppm for both samples and is plotted in FIG. 3 against catalyst temperature. It can readily been seen that the sooted catalyst generates appreciably more $CO_2$, indicating that the soot is being combusted.

A further test was carried out using a Volvo diesel engine on a rest bench. The diesel exhaust gas was split into two parallel streams and passed through a sample conventional oxidation catalyst and an identical catalyst sample preceded by a first catalyst carrying 120 g/ft³ (4.24 g/liter) of Pt. The back pressure on each stream was equalised and the engine was run under conditions which were known to generate soot, for four hours. The fuel used in the engine contained 500 ppm of sulphur. The oxidation catalysts were weighed before and after the test and the results are shown in FIG. 4. The results are an average of three tests, and then the tests were repeated using a zero sulphur fuel. It can be seen that although the removal of sulphur from the diesel fuel reduces the amount of soot deposited on the catalyst, the effect of the first catalyst reduces the amount of soot by at least 50% by weight for sulphur-containing fuel and shows a greater improvement for sulphur-free fuel.

What is claimed is:

1. An emission control system for internal combustion engines which emit carbonaceous soot particles, which system comprising a first catalyst effective to oxidize NOx to $NO_2$ and a second catalyst effective to oxidize hydrocarbons, carbon monoxide and volatile organic fractions, each catalyst being supported on a honeycomb flow-through monolith, whereby soot particles trapped on or within said second catalyst are combusted in the $NO_2$ containing gas from said first catalyst, and wherein the first catalyst is supported on a flexible metal monolith of up to 31 cells/cm², whereby soot particle collection on the first catalyst support is minimized.

2. A system according to claim 1, wherein said first catalyst contains 1.77 to 7.06 g/liter of catalyst volume, of platinum.

3. A system according to claim 1, wherein said second catalyst is selected from oxidation catalysts and lean-NOx three-way catalysts.

4. An internal combustion engine which emits carbonaceous soot particles during at least part of the operating cycle, fitted with an emission control system according to claim 1.

5. A light-duty diesel engine, fitted with an emission control system according to claim 1.

6. In a process for the purification of exhaust gases from a light duty internal combustion engine which emits carbonaceous soot particles by passing said gases over a honeycomb flow-through monolith and an oxidation catalyst effective at least to oxidize HC, CO and VOF, the improvement comprising first passing said gases over a first catalyst effective to oxidize NOx to $NO_2$ and subsequently passing the gas enriched with $NO_2$ over said honeycomb flow-through monolith and oxidation catalyst in order to enhance catalytic oxidation of soot particles trapped on or within said oxidation catalyst.

7. The process of claim 6 wherein the gas containing $NO_2$ also includes water vapor.

8. The process of claim 6, wherein the oxidation catalyst comprises a platinum group metal.

9. The process of claim 8, wherein the oxidation catalyst comprises a platinum group metal on a monolithic honeycomb.

10. The process of claim 9, wherein the honeycomb flow through catalyst includes a catalyst which facilitates particulate catalytic oxidation.

11. The process of claim 10, wherein the oxidation catalyst is a three way catalyst.

12. An emission control system for an internal combustion engine which emits carbonaceous soot particles, which system comprising a first catalyst effective to oxidize NOx to $NO_2$ and a second catalyst effective to oxidize hydrocarbons, carbon monoxide and volatile organic fractions, each catalyst being supported on a honeycomb flow-through monolith, the cell density and dimensions of said respective monoliths being selected to provide a greater space velocity over said first catalyst than over said second catalyst whereby soot particle collection on the first catalyst support is minimized and whereby soot particles trapped on or within said second catalyst are combusted in the $NO_2$ containing gas from said first catalyst.

13. A system according to claim 12, wherein said first catalyst contains 1.77 to 7.06 g/liter of catalyst volume, of platinum.

14. A system according to claim 12, wherein said second catalyst is selected from oxidation catalysts and lean-NOx three-way catalysts.

15. An internal combustion engine which emits carbonaceous soot particles during at least part of the operating cycle, fitted with an emission control system according to claim 12.

16. A light-duty diesel engine, fitted with an emission control system according to claim 12.

17. A system according to claim 12, wherein said first catalyst support is a flexible metal monolith.

18. A system in accordance with claim 17, wherein the cell density of said first monolith is up to 200 cells per square inch.

19. A system in accordance with claim 18, wherein the cell density of at least 400 cells per square inch.

* * * * *